Nov. 5, 1929.         N. G. MORICI         1,734,143
POWER TRANSMISSION APPARATUS
Filed Aug. 15, 1925         3 Sheets-Sheet 1

Witnesses:
William F. Kilroy
Harry L. White

Inventor:
Nazareno G. Morici
Hill & Hill
Attys

Nov. 5, 1929.  N. G. MORICI  1,734,143
POWER TRANSMISSION APPARATUS
Filed Aug. 15, 1925   3 Sheets-Sheet 2

Witnesses:
William F. Kilroy
Harry R. L. White

Inventor:
Nazarene G. Morici
Hill & Hill
Attys

Inventor:
Nazarene G. Morici

Patented Nov. 5, 1929

1,734,143

UNITED STATES PATENT OFFICE

NAZARENE GEORGE MORICI, OF CHICAGO, ILLINOIS

POWER TRANSMISSION APPARATUS

Application filed August 15, 1925. Serial No. 50,500.

My invention relates to power transmission devices and particularly to power transmission apparatus adapted for use in connection with internal combustion engines, electrical motors and the like.

The invention has among its objects the production of improved apparatus of the kind described, which is simple, compact, reliable, durable, convenient, efficient and satisfactory for use wherever found applicable.

A particular object of the invention is the production of improved apparatus of the kind described which is especially adapted for motor vehicle use and which obviates the use of the usual clutch.

Another particular object of the invention is to produce improved apparatus of the kind described which is largely automatic in operation.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Figure 3:
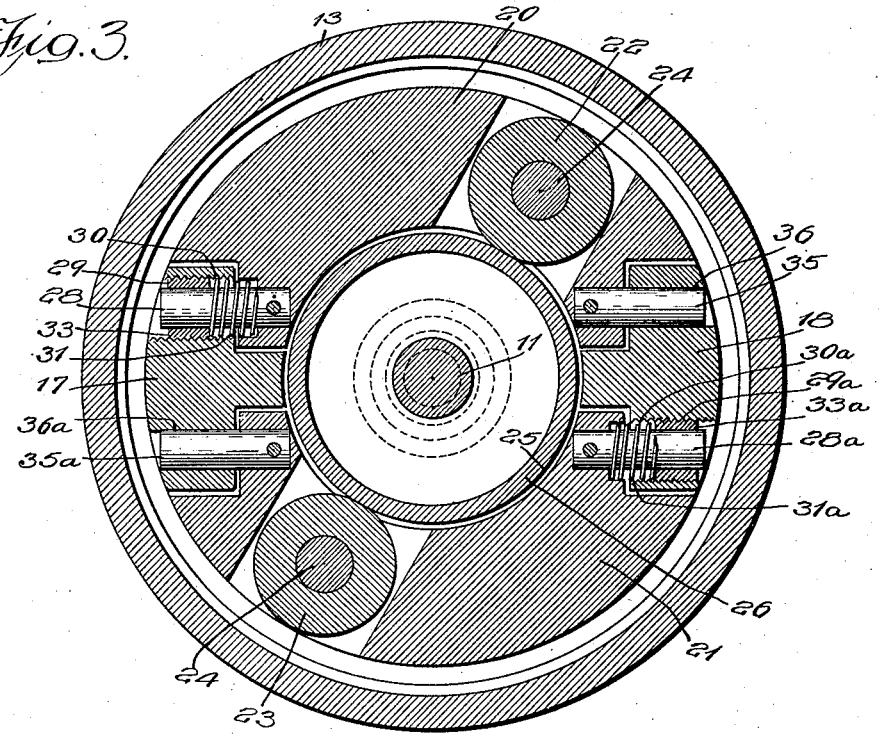
Fig. 3 is a section taken on line 3—3 of Fig. 2.
Figure 4:
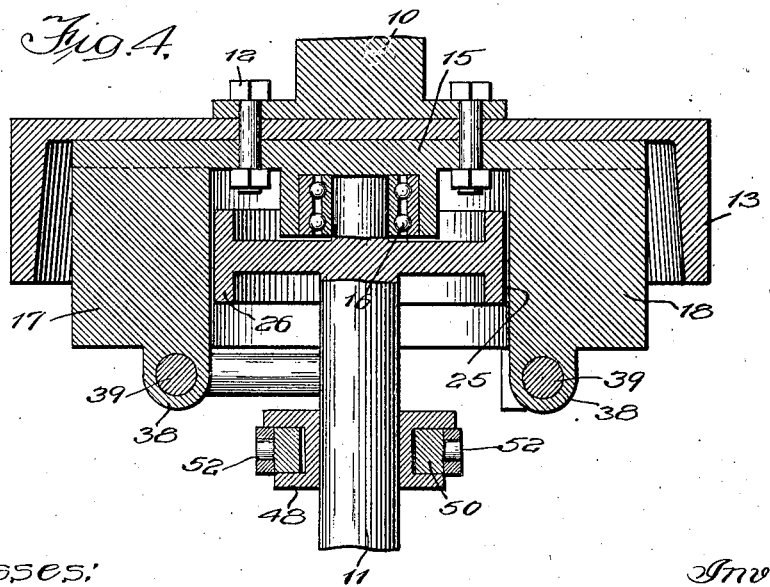
Fig. 4 is a section taken on line 4—4 of Fig. 1.
Figure 5:
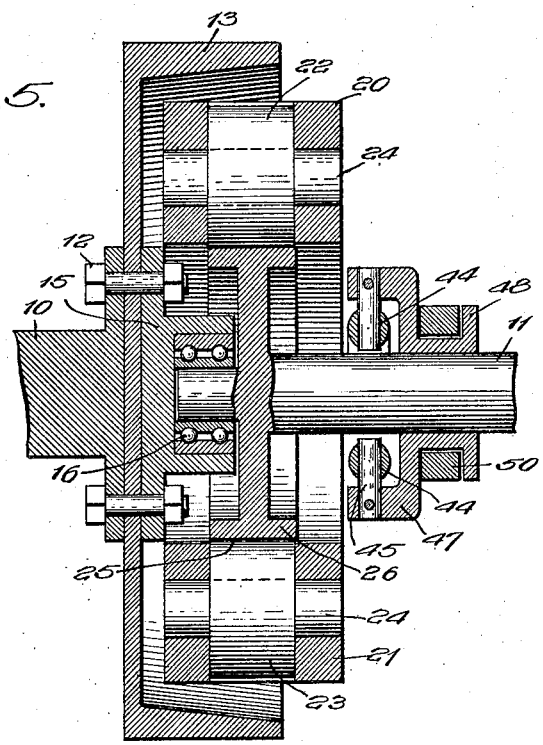
Fig. 5 is a section taken on line 5—5 of Fig. 1.

In the drawings, 10 is the crank shaft of an internal combustion engine forming part of an automobile, and 11 is the propeller shaft of the automobile which shaft may be made in sections connected by any suitable means such as, for instance, reversing apparatus. In general, 10 may be any suitable driving element and 11 may be any suitable driven element, as the invention is limited to use in connection with an internal combustion engine only to the extent defined in the appended claims. Secured to the crank shaft 10 by bolts 12 is a fly-wheel 13. The bolts 12 also serve to secure a member 15 to the crank shaft 10 (Fig. 5). One end of the propeller shaft 11 is rotatably journaled in the member 15, a ball bearing 16 or the equivalent being provided for this purpose. The member 15 is provided with two diametrically disposed T-shaped heads 17 and 18 (Figs. 3 and 4). Interposed between the heads 17 and 18 are arcuate members 20 and 21 which carry rollers 22 and 23, respectively, the rollers 22 and 23 being rotatably journaled by pins 24 which are mounted in the arcuate members 20 and 21. The rollers 22 and 23 are adapted to cooperate with a substantially cylindrical surface 25 provided upon a collar 26 formed integral with the propeller shaft 11 (Figs. 3 and 5). Secured to and projecting from one end of the arcuate member 20 are pins 28 which have their outer ends slidably journaled in bushings 29 screw-threaded into bores 30 formed in the T-shaped head 17. Disposed around the pins 28 and interposed between the bushings 29 and the arcuate member 20 are compression springs 31. The bushings 29 are provided with slots 33 so that the bushings may be engaged by any suitable tool (not shown) and adjusted to increase or decrease the tension of the springs 31. Secured to and projecting from one end of the arcuate member 21 are pins 28$^a$ which have their outer ends slidably journaled in bushings 29$^a$, the bushings 29$^a$ being screw-threaded in bores 30$^a$ formed in the T-shaped head 18. Interposed between the bushings 29$^a$ and the arcuate member 21 are compression springs 31$^a$. The bushings 29$^a$ are provided with slots 33$^a$ so that the bushings may be adjusted by any suitable tool. The parts 28$^a$, 29$^a$ and 31$^a$ are preferably substantially identical with the aforementioned parts 28, 29 and 31. The purpose of this construction will presently appear.

Aligned with the pins 28 and secured to the arcuate member 20 are pins 35 which have their outer ends slidably mounted in bores 36 formed in the T-shaped head 18. Aligned with the pins 28ª and secured to the arcuate member 21 are pins 35ª which have their outer ends slidably mounted in bores 36ª formed in the T-shaped head 17.

Obviously, the arcuate members 20 and 21 may move relatively to the member 15, such movement being parallel to the center lines of the pins 28, 28ª, 35 and 35ª. It will be noted that the springs 31 when compressed urge the member 20 toward the right (Fig. 3) and that the springs 31ª when compressed urge the arcuate member 21 toward the left (Fig. 3).

Figure 1:
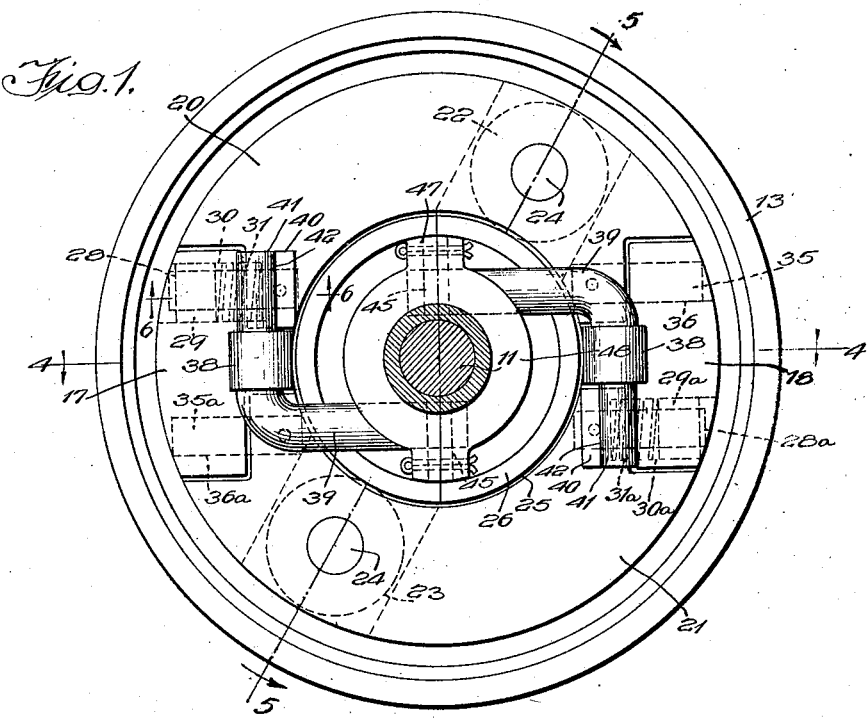
Fig. 1 is an elevation partly in section of apparatus embodying the invention.
Figure 2:
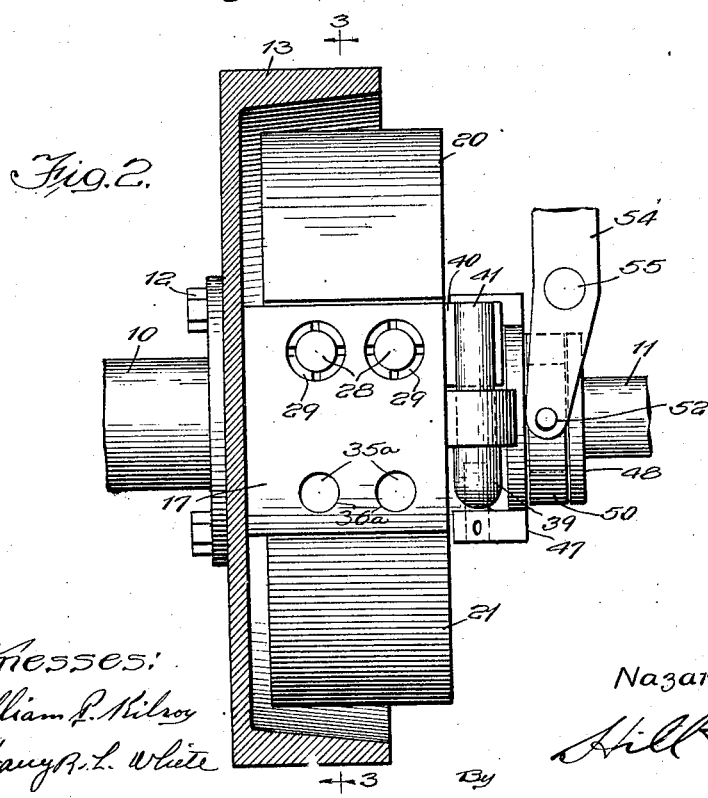
Fig. 2 is an elevation partly in section of the apparatus shown in Fig. 1, the view being taken looking from the left in Fig. 1.
Figure 6:
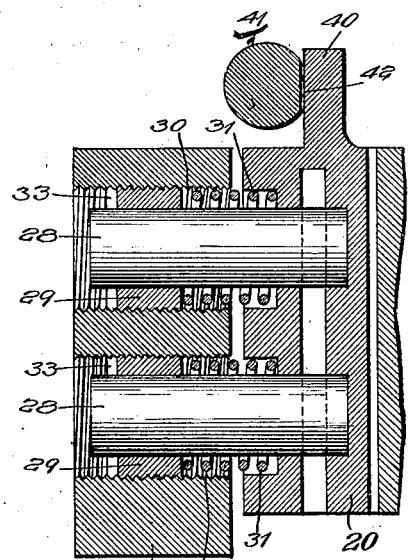
Fig. 6 is a section taken on line 6—6 of Fig. 1.

As best shown in Figs. 1 and 4, the member 15 is provided with diametrically disposed lugs 38 in which are pivotally mounted levers 39. One end of each lever 39 is adapted to cooperate with a lug 40 projecting from one of the arcuate members 20 and 21, the lugs 40 being preferably formed integral with the arcuate members 20 and 21 (Fig. 6). These ends of the levers 39 are provided with arcuate surfaces 41 and flattened surfaces 42, the flattened surfaces 42 being normally presented to the lugs 40. The other end of each lever 39 is provided with a bore 44 which accommodates one of a pair of pins 45 secured to and projecting from a collar 47 slidably and rotatably journaled upon the propeller shaft 11. The collar 47 is provided with an annular groove 48 in which rides a ring 50 having trunnions 52. A foot pedal 54 pivotally mounted upon any suitable part of the automobile chassis, as at 55, operatively engages the trunnions 52.

When the engine is not in operation and when it is idling or running at low speed in a counter-clockwise direction (Fig. 3), the several parts of the above described power transmission apparatus occupy relative positions wherein they are shown in the drawings, the springs 31 and 31ª being so designed and adjusted that there will be no relative displacement between the member 15 and the arcuate members 20 and 21 until the engine reaches a predetermined speed. This speed is generally 150 R. P. M. or thereabouts. As the speed increases the arcuate members 20 and 21 move relatively to the cylindrical surface 25 against the action of the springs 31 and 31ª, respectively. Obviously, the rollers 22 and 23 will be urged against the cylindrical surface 25 and will, when urged against the cylindrical surface 25 with sufficient force, cause the collar 26 to rotate in unison with the arcuate members 20 and 21. The tendency is to pick up the load gradually. The rollers 22 and 23 may be provided with any suitable facing but I prefer to make them of hardened material without a supplemental facing. The apparatus is preferably designed and adjusted so that there will be an exceedingly small clearance between the rollers and cylindrical surface 25 when the engine is not in operation. Obviously, as the engine accelerates its speed, there is less and less relative movement between the rollers and the cylindrical surface 25 until the driving and driven elements rotate in unison. If the engine is slowed down before the predetermined number of revolutions per minute is attained the driving element will be disconnected automatically from the driven element.

The rollers 22 and 23 may be disengaged from the cylindrical surface 25 at any time by displacing the pedal 54 around its pivotal axis. This displacement of the pedal causes levers 39 to rock their flattened surfaces 42 in such manner that the arcuate members 20 and 21 are moved in directions to disengage the rollers from the cylindrical surface 25. This construction obviates the necessity of providing the usual frictional clutch in the automobile.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In power transmission apparatus, a driving element, a driven element co-axial therewith and having a cylindrical surface formed thereon, said cylindrical surface being concentric with the axis of rotation of the driven element, a member on said driving element movable relatively thereto in a plane transverse to the axis of said driving element, a roller carried by said member and brought into tangential engagement with said cylindrical surface for operatively connecting the driving element to the driven element, and means connected with said member for maintaining said roller out of engagement with said cylindrical surface until said driving element has attained a predetermined number of revolutions per minute.

2. In a power transmission apparatus, a driving element, a driven element coaxial therewith and having a cylindrical surface formed thereon, said cylindrical surface being concentric with the axis of rotation of the driven element, a member rigidly secured to said driving element, a second member carried by said first mentioned member and slidably movable relatively thereto in a plane transverse to the axis of said driving element, a roller carried by said second member and adapted to be moved into tangential engagement with said cylindrical surface for operatively connecting said driving element to the driven element, and resilient means operatively related to said second member for maintaining said roller out of engagement with said cylindrical surface until said driving element has attained a predetermined number of revolutions per minute.

3. In a power transmission apparatus, a driving element, a driven element coaxial therewith and having a cylindrical surface formed thereon, said cylindrical surface being concentric with the axis of rotation of the driven element, a member rigidly secured to said driving element, a second member carried by said first mentioned member and slidably movable relatively thereto in a plane transverse to the axis of said driving element, a roller carried by said second member and adapted to be brought into tangential engagement with said cylindrical surface for operatively connecting said driving element to the driven element, a spring positioned between said members for maintaining said roller out of engagement with said cylindrical surface until said driving element has attained a predetermined number of revolutions per minute, and means for adjusting the tension of said spring.

4. In a power transmission apparatus, a driving element, a driven element coaxial therewith and having a cylindrical surface formed thereon, said cylindrical surface being concentric with the axis of rotation of the driven element, a member having a plurality of heads formed thereon rigidly secured to said driving element, a second member carried by said first mentioned member and slidably mountd on said heads in a manner to move in a plane transverse to the axis of said driving element, a roller carried by said second member and adapted to be brought into tangential engagement with said cylindrical surface for operatively connecting said driving element to the driven element, a spring operatively related to said second member for maintaining said roller out of engagement with said cylindrical surface until said driving element has attained a predetermined number of revolutions per minute, and means cooperable with one of said heads for adjusting the tension of said spring.

5. In power transmission apparatus, a driving element, a driven element coaxial therewith and having a cylindrical surface formed thereon, said cylindrical surface being concentric with the axis of rotation of the driven element, a member on said driving element movable relatively thereto in a plane transverse to the axis of said driving element, a roller carried by said member and brought into tangential engagement with said cylindrical surface for operatively connecting the driving element to the driven element, means connected with said member for maintaining said roller out of engagement with said cylindrical surface until said driving element has attained a predetermined number of revolutions per minute, and manually operated means for disconnecting said driving and driven elements regardless of the speed of rotation thereof.

6. In power transmission apparatus, a driving element, a driven element coaxial therewith and having a cylindrical surface formed thereon, said cylindrical surface being concentric with the axis of rotation of the driven element, a member on said driving element slidably movable relatively thereto in a plane transverse to the axis of said driving element, a roller carried by said member and brought into tangential engagement with said cylindrical surface for operatively connecting the driving element to the driven element, means connected with said member for maintaining said roller out of engagement with said cylindrical surface until said driving element has attained a predetermined number of revolutions per minute, and manually actuated means pivotally mounted on said first mentioned member and cooperable with a portion of said slidable member for disconnecting said driving and driven elements at the will of the operator regardless of the speed of rotation of said elements.

In testimony whereof, I have hereunto signed my name.

NAZARENE GEORGE MORICI.